United States Patent [19]

Yoshinaka

[11] Patent Number: 4,745,039
[45] Date of Patent: May 17, 1988

[54] SEALED LEAD STORAGE BATTERY

[75] Inventor: Minoru Yoshinaka, Fujisawa, Japan

[73] Assignee: Matsushita Electric Industrial Co., Ltd., Osaka, Japan

[21] Appl. No.: 931,062

[22] Filed: Nov. 17, 1986

[30] Foreign Application Priority Data

Dec. 23, 1985 [JP] Japan .................. 60-289902

[51] Int. Cl.$^4$ ............................ H01M 2/12
[52] U.S. Cl. ......................... 429/54; 429/59
[58] Field of Search ............. 429/53, 54, 87, 59

[56] References Cited

U.S. PATENT DOCUMENTS

| 3,257,237 | 6/1966 | Jache ........................ 429/54 |
| 3,560,267 | 2/1971 | Guilliams ................... 429/54 |
| 3,715,239 | 2/1973 | Walker et al. .............. 429/54 |
| 3,904,441 | 9/1975 | Badger ....................... 429/87 |

FOREIGN PATENT DOCUMENTS

| 1074813 | 7/1967 | United Kingdom ........... 429/54 |
| 2085218 | 4/1982 | United Kingdom ........... 429/54 |

Primary Examiner—Donald L. Walton
Attorney, Agent, or Firm—Wenderoth, Lind & Ponack

[57] ABSTRACT

A sealed lead storage battery including at least one negative electrode plate capable of absorbing oxygen gas generated from a positive electrode plate during recharging thereof, which battery comprises a battery casing having a breathing hole defined therein in communication with the interior of the battery casing, and a safety valve including a flat rubber plate of synthetic material overlaying the breathing hole in contact with the battery casing and an elastic pad made of open-celled elastic material placed over the flat rubber plate so as to urge the flat rubber plate against the battery casing.

5 Claims, 2 Drawing Sheets

SEALED LEAD STORAGE BATTERY

BACKGROUND OF THE INVENTION

1. Field of Technology

The present invention generally relates to a sealed lead storage battery and, more particularly, to an improvement in a safety valve used in the sealed lead storage battery.

2. Description of the Prior Art

A sealed lead storage battery is widely used in portable electric appliances as a source of electricity because, in view of the fact that a liquid electrolyte is soaked in a woven mat of glass fibers which serves as a separator and no electrolyte exists substantially in a free flow state, there is no substantial possibility that the liquid electrolyte may leak out of the battery casing. It is usual that the recharging of the sealed lead storage battery with electric current inevitably results in the generation of a gaseous body of oxygen from one or more positive electrode plates, and the oxygen gas so generated is removed by absorption into a corresponding number of negative electrode plates with no possibility of the gas leaking outside the battery casing.

However, when the sealed lead storage battery is recharged with electric current of a value higher than the rated current, the rate of generation of oxygen tends to be higher than the gas absorbing speed exhibited by the negative electrodes with the result that the internal pressure inside the battery casing increases. In view of this, it is a common practice to employ at least one safety valve in the battery casing to permit the excess gas inside the battery casing to be relieved to the atmosphere before the battery casing ruptures as a result of the increased internal pressure. The safety valve generally used in the prior art sealed lead storage battery is generally required to have a dual function; as a pressure relief valve and as a flow check valve. While the safety valve works as a pressure relief valve when the internal pressure inside the battery casing increases as hereinabove described, the same safety valve works as a flow check valve to substantially avoid or minimize any possible entry of oxygen-rich gas into the battery casing. This is because, so long as the sealed lead storage battery is allowed to stand for a substantial time, and unless the communication between the atmosphere and the interior of the battery casing is interrupted, oxidization of the negative electrode plates tending to absorb oxygen tends to be accelerated, accompanied by the accelerated self-discharge of the lead storage battery.

Because of the employment of the dual-function safety valve, not only is the internal pressure inside the battery casing maintained at a safe value, but also during the normal use of the storage battery the negative electrode plates absorb oxygen, wherefore decompression is created inside the battery casing at all times, thereby ensuring the safe use of the sealed lead storage battery.

According to the prior art, the dual-function safety valve comprises a rubber cap mounted on the battery casing so as to close a tubular breathing passage which communicates with respective cell chambers inside the battery casing. The rubber cap is retained in position by a lid or cover member exteriorly mounted thereon so that the rubber cap will not separate away from the tubular breathing passages during the operation of the safety valve.

With the safety valve so constructed, the prior art sealed lead storage battery requires the use of the tubular breathing passage for the installation of the rubber cap. Also, depending on the type of material used to make the rubber cap, and the thickness, the hardness and the size of the rubber cap, the performance of the safety valve tends to vary. Moreover, a relatively large volume is required to accommodate the safety valve, and therefore, minimization of the size of the lead storage battery as a whole is often hampered.

SUMMARY OF THE INVENTION

The present invention has been developed with a view to substantially eliminating the above described problems inherent in the prior art sealed lead storage battery and has for its essential object to provide a sealed lead storage battery which is reliable in performance and wherein the safety valve requires a minimized volume of space for the installation thereof, making it possible to manufacture the sealed lead storage battery in compact size.

In order to accomplish the above described object of the present invention, a dual-function safety valve employed in the present invention comprises a flat rubber piece mounted on the battery casing so as to overlay a breathing opening defined in the battery casing, and an elastic insert of open-celled foam material placed above the flat rubber piece and exteriorly loaded by a lid or cover member so as to urge the flat rubber piece against the breathing opening.

With this construction according to the present invention, not only is the use of the tubular breathing passage eliminated, but also the space occupied by the safety valve can be minimized, making it possible to manufacture the sealed lead storage batery in compact size. Moreover, the safety valve can operate at a predetermined opening pressure because of the use of the elastic insert made of open-celled foam material.

BRIEF DESCRIPTION OF THE DRAWINGS

This and other objects and features of the present invention will become clear from the following description taken in conjunction with preferred embodiments thereof with reference to the accompanying drawings, in which like parts are designated by like reference numerals and in which.

DETAILED DESCRIPTION OF THE INVENTION

Figure 1:
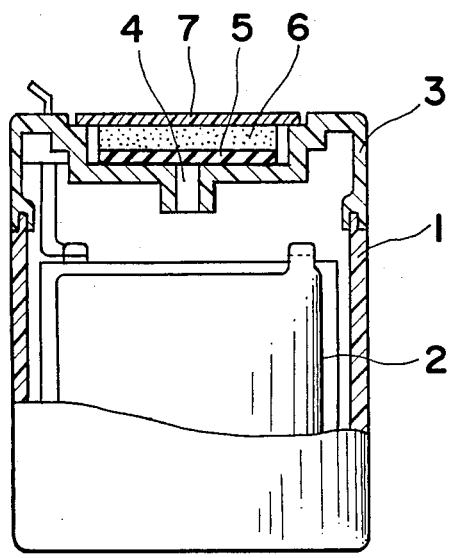
FIG. 1 is a schematic side view of a sealed lead storage battery, with a portion cut away, according to a first preferred embodiment of the present invention.
Figure 2:
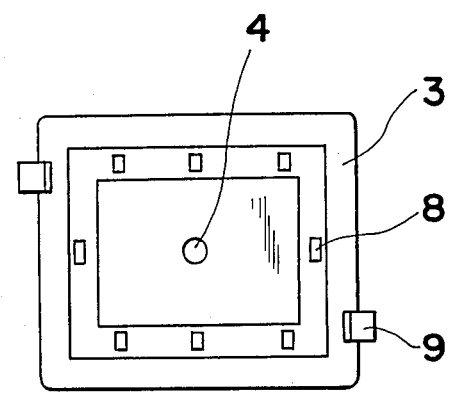
FIG. 2 is a top plan view of the sealed lead storage battery shown in FIG. 1, with a lid removed.
Figure 3:
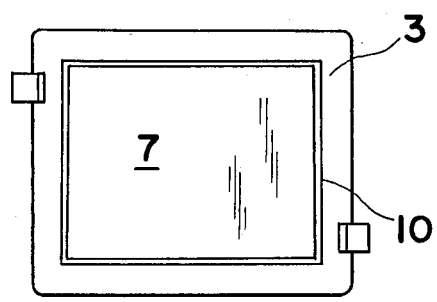
FIG. 3 is a top plan view of the sealed lead storage battery shown in FIG. 1, with the lid mounted.

Referring first to FIGS. 1 to 3, a sealed lead storage battery embodying the present invention comprises a generally rectangular box-like battery casing and a stack of pole plates 2 including positive and negative electrode plates and separators stacked together in a manner well known to those skilled in the art. The battery casing includes a container 1 made of synthetic resin, and a cap 3 mounted in a sealed fashion in the container 1 with the stack of pole plates 2 accommodated within the interior thereof, said cap 3 being made of the same material as that for the container. As is well known to those skilled in the art, a liquid electrolyte comprising a dilute solution of sulphuric acid is contained within the container 1 in the form as soaked in the separators.

A wall portion of the cap 3 which confronts the opening of the container 1 is recessed a predetermined small distance inwardly of the battery casing to provide a valve chamber, the bottom of which is formed with a breathing hole 4 communicating the interior of the battery casing with the atmosphere therethrough.

A flat layer 5, preferably about 0.3 mm in thickness, a synthetic rubber material as will be described later is placed on the bottom of the valve chamber so as to overlay the breathing hole 4, which rubber layer 5 is in turn elastically urged against the bottom of the valve chamber by an elastic pad 6 made of such a material as will be described later. The rubber layer 5 is preferably made of neoprene having a hardness of 60 to 65 degrees as measured according to a testing method set forth in JIS K6301 (i.e., Section K6301 of Japan Industrial Standards), but any other synthetic resin, for example, styrene-butadiene rubber, may be employed as a material for the rubber layer 5.

The elastic pad 6 may be made of any suitable open-celled foam or sponge material including a methylene copolymer (EPDM) of ethylene-propylene-diene, neoprene rubber, styrene-butadiene rubber, polyurethane or polypropylene. It is to be noted that the term "open-celled material" means a porous material having minute pores or cells that communicate with one another, in contrast to a closed-cell material having independent minute pores or cells. The reason for the employment of the open-celled foam material for the elastic pad 6 will now be described with particular reference to FIG. 5.

Figure 5:
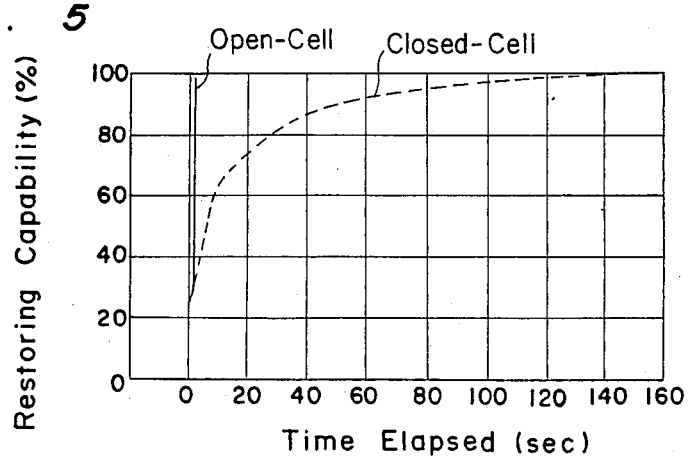
FIG. 5 is a graph showing the performance characteristic of different foam materials.

Given the elastic blocks of open-celled and closed-cell materials, respectively, it has been found that, once they are compressed by the application of an equal external force, the elastic block of closed-cell material requires a longer time to restore to the original shape, as shown by the broken line in the graph of FIG. 5, than that required by the elastic block of open-celled material as shown by the solid line in the same graph. The graph of FIG. 5 is based on a series of tests conducted with the use of the elastic blocks of open-celled material and closed-cell material, respectively, both of which had equal voids of 90% and had been compressed to a thickness equal to 20% of the original thickness. So far as the elastic block of closed-cell material is concerned, some of the cells containing air were ruptured when it was compressed to the test thickness, and it took about 140 seconds for the compressed elastic block to restore to the original shape subsequent to the release of the external force therefrom.

In view of the foregoing, the use of the open-celled material is essential in the practice of the present invention as a material for the elastic pad 6 so that the safety valve can work satisfactorily. Where the closed-cell material is used for the elastic pad 6, it may happen that the safety valve, once opened to let gas inside the battery casing escape to the atmosphere, will fail to close the breathing hole 4.

The elastic pad 6 made of the specific material as hereinabove described is laid over the rubber layer 5 within the valve chamber in the cap 3 and is covered by a plate lid 7 firmly connected to the cap 3, as will be described subsequently, by the use of any known ultrasonic bonding technique. The thickness of the elastic pad 6 is so selected that, when the plate lid 7 is bonded to the cap 3 so as to close the opening of the valve chamber in the cap 3 with both of the rubber layer 5 and the elastic pad 6 confined between the bottom of the valve chamber and the plate lid 7, the elastic pad 6 can be compressed down to a predetermined thickness. In this condition, the communication between the atmosphere and the interior of the battery casing through the breathing hole 4 is interrupted by the rubber layer 5 urged by the elasticity of the elastic pad 6 against the bottom of the valve chamber. Preferably, an annular portion of the bottom of the valve chamber around the breathing hole 4 may be applied with a liquid sealing agent, for example silicone oil, to facilitate the selective opening and closure of the safety valve.

As best shown in FIG. 2 showing the sealed lead storage battery with the plate lid 7 removed, a shoulder formed in the peripheral wall defining the valve chamber is formed with a plurality of minute projections 8 protruding towards the opening of the valve chamber. The plate lid 7 closing the opening of the valve chamber and being of a size undersized with respect to the area of the opening of the valve chamber is fusion-bonded to these minute projections 8. Thus, the plate lid 7 is connected firmly with the cap 3 through the minute projections 8, leaving interstices between the plate lid 7 and the shoulder in the peripheral wall defining the valve chamber, through which interstices the valve chamber is communicated to the atmosphere by way of a clearance 10 created by the difference in size between the plate lid 7 and the opening of the valve chamber as best shown in FIG. 3. It is to be noted that, as a matter of design practice, the battery casing, particularly the cap 3, is provided with terminal members 9 rigidly mounted thereon for electric connection with an external load circuit.

Thus, it is clear that, in the event that the internal pressure inside the battery casing attains a value sufficient to overcome a resilient force applied by the partially compressed elastic pad 6, the rubber layer 5 is upwardly lifted against the elasticity of the elastic pad 6 to permit the excess gas inside the battery casing to be relieved to the atmosphere, but as long as the internal pressure remains lower than the above mentioned value, the rubber layer 5 is held in contact with the bottom of the valve chamber while closing the breathing hole 4. The open-close valving pressure at which the safety valve operates can be selected by suitably choosing the hardness of the open-celled material for the elastic pad 6 and/or the extent to which the elastic pad 6 confined in the valve chamber is compressed. Therefore, the open-close valving pressure can be chosen as desired in consideration of the material and the wall thickness of the battery casing, the shape of the sealed lead storage battery and/or the pressure characteristic of the battery casing.

In the foregoing description, reference has been made to the battery casing having one breathing hole and one chamber for accommodating the single stack of the pole plates. Application of the present invention to a battery casing having two spaced breathing holes in one valve chamber and a chamber for each breathing hole is illustrated in FIG. 4, the breathing holes being designated respectively by 4a and 4b.

Figure 4:
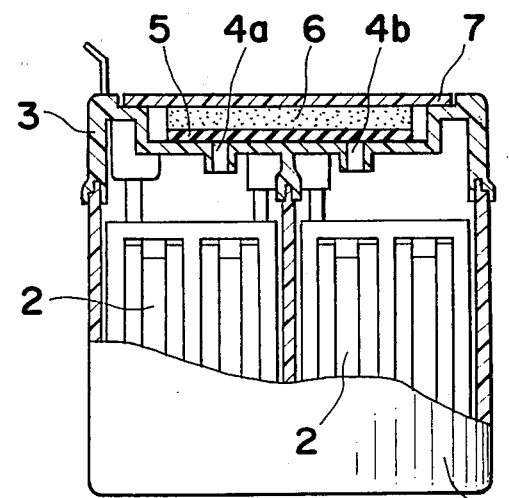
FIG. 4 is a view similar to FIG. 1, showing another preferred embodiment of the present invention.
Figure 6:
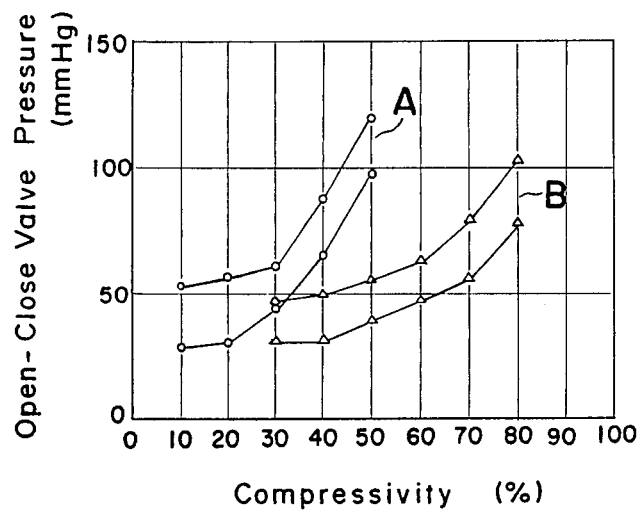
FIG. 6 is a graph showing the relationship between the open-close valve pressure and the extent of compression of the different foam materials.

As shown in FIG. 4, the chambers inside the battery casing are separated by a partition wall and accommodate therein the respective stacks 2 of pole plates. In this embodiment, the rubber layer 5 is used to cover both of the breathing holes 4a and 4b. The relationship between the open-close valving pressure and the extent of compression of the elastic pad is illustrated in FIG. 6. The elastic pad used was made of EPDM as a principal material mixed with an additional material and had a volume of 92%. In FIG. 6, the curve shown by A is the case when the elastic pad was loaded with 93 g/cm$^2$ at the time it had been compressed 50%, whereas the curve shown by B is the case when the elastic pad was loaded with 25 g/cm$^2$ at the time it had been compressed 50%. The rubber layer in each of the batteries used for testing purposes for closing the breathing hole or holes is made of neoprene having a hardness of 60 degrees and having a thickness of 0.3 mm and constitutes the safety valve. As can be seen from FIG. 6, by suitably choosing the modulus of elasticity and/or the extent of compression of the elastic pad, any desired open-close valving pressure can be selected.

Figure 7:
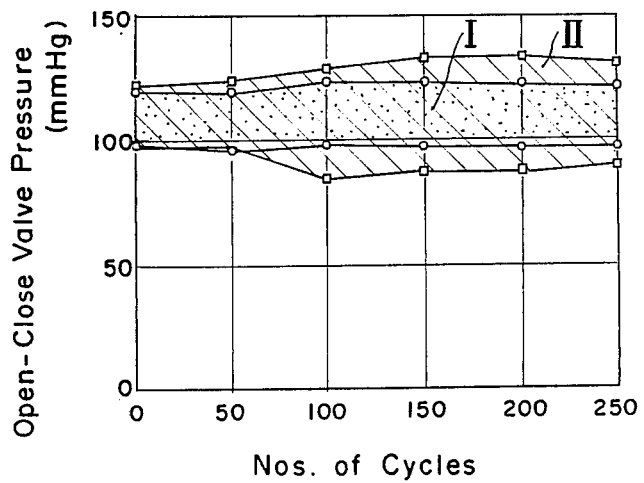
FIG. 7 is a graph showing the relationship between the open-close valve pressure and the number of recharging cycles.

FIG. 7 illustrates the relationship between the open-close valving pressure and the life of the sealed lead storage battery. In FIG. 7, the hatched area shown by I represents the elastic pad which exhibited the curve A shown in FIG. 6, whereas the shaded area shown by II has been exhibited by the prior art cap-like safety valve. As can be understood from the comparison, the sealed lead storage battery according to the present invention can operate with a generally constant open-close valving pressure throughout the available life of the battery, while the open-close valving pressure in the prior art sealed lead storage battery changes with increase in number of recharging cycles. During the test conducted to obtain the graph of FIG. 7, each six samples were tested under a condition in which, each time the battery has been discharged 80%, it was recharged at 40°.

From the foregoing, it has now become clear that the present invention has the following meritorious effects.

(1) Since as a valve member the flat rubber layer is accommodated within the valve chamber and is in turn urged by the elastic pad of open-celled material, the valve itself does not protrude outwardly of the contour of the battery casing and, therefore, the battery can be manufactured in compact size.

(2) Since the open-close valving pressure can be selected as desired by adjusting the compressive load applied by the elastic pad, the versatility can be increased by suitably selecting the shape, the pressure resistance and the material of the battery casing.

(3) The resiliency of the flat rubber layer minimizes the possible wrinkling thereof which would result from the difference between the internal pressures inside the respective chambers within the battery casing, and also any possible influence which would be brought about by the effect of a tension, and since one and the same valve member is used for the two breathing holes, the number of component parts required to fabricate the sealed lead storage battery and, also, the number of manufacturing steps can be reduced.

(4) The valve is simplified, and the open-close valving pressure can be stabilized throughout the life of the sealed lead storage battery according to the present invention.

Although the present invention has been fully described in connection with the preferred embodiments thereof with reference to the accompanying drawings, it is to be noted that various changes and modifications are apparent to those skilled in the art. Unless these changes and modifications depart from the scope of the present invention as defined by the appended claims, they should be construed as included therein.

What is claimed is:

1. A sealed lead storage battery including at least one negative electrode plate capable of absorbing oxygen gas generated from a positive electrode plate during recharging thereof, which battery comprises a battery casing having a breathing hole defined therein in communication with the interior of the battery casing, and a safety valve including a flat rubber plate of synthetic material overlaying the breathing hole in contact with the battery casing and an elastic pad made of open-celled elastic material placed over the flat rubber plate so as to urge the flat rubber plate against the battery casing.

2. The battery as claimed in claim 1, wherein that portion of the battery casing around the breathing hole which contacts the flat rubber plate is applied with a liquid sealing agent.

3. The battery as claimed in claim 1, wherein the open-celled elastic material is selected from the group consisting of a copolymer of ethylene-propylene-diene, polyurethane, polypropylene, neoprene and styrene-butadiene rubber.

4. The battery as claimed in claim 2, wherein the liquid sealing agent is silicone oil.

5. A sealed lead storage battery including negative electrode plates capable of absorbing oxygen gas generated from positive electrode plates during recharing thereof, which battery comprises a battery casing having a plurality of breathing holes defined therein in communication with the interior of the battery casing, and a safety valve including a flat rubber plate of synthetic material overlaying the breathing holes in contact with the battery casing and an elastic pad made of open-celled elastic material placed over the flat rubber plate so as to urge the flat rubber plate against the battery casing.

* * * * *